United States Patent [19]
Murakawa et al.

[11] Patent Number: 5,873,224
[45] Date of Patent: Feb. 23, 1999

[54] POWER TRANSMITTING STRUCTURE FOR A SELF-PROPELLING VEHICLE HAVING A WORKING IMPLEMENT

[75] Inventors: Masatake Murakawa; Hiroki Nagai; Kazuaki Kurohara, all of Sakai, Japan

[73] Assignee: Kubota Corporation, Osaka, Japan

[21] Appl. No.: 711,451

[22] Filed: Sep. 6, 1996

[30] Foreign Application Priority Data

Sep. 7, 1995 [JP] Japan ..................................... 7-230191
Apr. 9, 1996 [JP] Japan ..................................... 8-086111
Apr. 9, 1996 [JP] Japan ..................................... 8-086112

[51] Int. Cl.$^6$ ............................ A01D 34/66; A01D 34/82
[52] U.S. Cl. ............................. 56/11.4; 56/11.8; 56/14.7; 56/DIG. 6; 56/DIG. 22
[58] Field of Search ................................... 56/15.7, 11.4, 56/11.5, 11.7, 11.8, 14.7, 15.8, DIG. 6, DIG. 22

[56] References Cited

U.S. PATENT DOCUMENTS

| | | | |
|---|---|---|---|
| 3,613,815 | 10/1971 | Meylink et al. | 56/11.7 X |
| 4,321,783 | 3/1982 | Kawasaki et al. | 56/15.8 |
| 4,879,867 | 11/1989 | Wenzel | 56/11.5 X |
| 4,977,732 | 12/1990 | Minter | 56/11.4 |
| 5,284,115 | 2/1994 | Imanishi | 123/41.7 |
| 5,317,936 | 6/1994 | Shiba | 74/606 R |
| 5,337,543 | 8/1994 | Kitamura | 56/10.8 |
| 5,367,861 | 11/1994 | Murakawa | 56/11.8 |
| 5,526,892 | 6/1996 | Matsuda | 180/53.1 |

FOREIGN PATENT DOCUMENTS 63-32009 8/1988 Japan.
63-164028 10/1988 Japan.

Primary Examiner—Terry Lee Melius
Attorney, Agent, or Firm—Webb Ziesenheim Bruening Logsdon Orkin & Hanson, P.C.

[57] ABSTRACT

A power transmitting structure for a mid-mount mower having a mower unit disposed in a middle region of a vehicle body. The power transmitting structure includes an engine disposed adjacent front wheels, axle shafts for rotating drive wheels, a stepless transmission operatively connected to the axle shafts, and a power branching device. The power branching device includes a branch input shaft connected to the engine through an engine power transmitting device extending longitudinally of the vehicle body, a first branch output operatively connected to the stepless transmission, and a second branch output operatively connected to the mower unit. The first branch output is a pulley connected to an input pulley of the stepless transmission through a belt to transmit power to the input pulley. The power branching device is disposed independently of and spaced from the stepless transmission. The mower unit is suspended below the engine power transmitting device between the engine and the power branching device.

17 Claims, 13 Drawing Sheets

POWER TRANSMITTING STRUCTURE FOR A SELF-PROPELLING VEHICLE HAVING A WORKING IMPLEMENT

BACKGROUND OF THE INVENTION

1. Field of the Invention

This invention relates to a power transmitting structure for a self-propelling vehicle having a working implement, for transmitting power of an engine to both a wheel driving transmission and the working implement. In particular, the invention relates to a power transmitting structure for use on a mid-mount mower.

2. Description of the Related Art

A mid-mount mower as noted above is known from U.S. Pat. No. 5,526,892. In this mower, an intermediate transmission shaft connected to an engine output shaft and extending longitudinally of a vehicle body is connected to an input shaft of an HST (Hydrostatic Stepless Transmission) through a coupling. The coupling has a first pulley formed peripherally thereof. A second pulley is attached to a PTO shaft connected to a mower unit disposed below. The first and second pulleys transmit power of the engine to the mower unit through a belt transmission mechanism. In this structure, the HST input shaft directly connected to the intermediate transmission shaft is disposed at substantially the same height as the engine output shaft. Thus, a free space is formed below the intermediate transmission shaft. This free space is used to suspend the mower unit from the vehicle body.

In this known structure, the first pulley acting as a power branching element for driving the mower unit is formed as an integral part of the transmission. This results in a disadvantage of allowing only a limited degree of freedom for construction and layout of the HST and the PTO shaft connected to the mower unit.

SUMMARY OF THE INVENTION

This invention has been made having regard to the state of the art noted above, and its object is to provide a power transmitting structure for a self-propelling vehicle having a working implement, which allows a high degree of freedom for construction and layout of a transmission and a PTO shaft connected to the working implement.

The above object is fulfilled, according to this invention, by a power transmitting structure comprising:

- a transmission operatively connected to axle shafts;
- a power branching device including a branch input shaft operatively connected to an engine, a first branch output operatively connected to the transmission, and a second branch output operatively connected to a working implement, the power branching device being disposed independently of the transmission; and
- a propelling drive transmitting device for connecting the first branch output to the transmission.

With the above construction, power is transmitted from the engine to the power branching device disposed independently of the transmission, from which the power is distributed to the transmission and the working implement. With the power branching device provided independently of the transmission, an increased degree of freedom is secured for laying out the transmission and mower unit. Besides, transmission mechanisms may be selected from varied types, as desired, for transmitting power from the engine to the transmission and from the transmission to a different transmission or to the working implement.

In a preferred embodiment of this invention, the transmission has a housing formed separately from a housing of the power branching device. The respective housings need not be altered in design even when a desired spacing is selected between the transmission and power branching device.

The engine and the branch input shaft may be operatively connected to each other through an engine power transmitting device extending longitudinally of the vehicle body. Where a mower unit is attached as the working implement, the mower unit may be disposed in a free space formed below the engine power transmitting device. Consequently, the mower unit may be raised and lowered through a sufficient range. Where the engine has an engine output shaft extending horizontally, the engine power transmitting device may comprise an intermediate transmission shaft. Where the engine has an engine output shaft extending vertically, the engine power transmitting device may comprise a belt transmission mechanism.

Where the power transmitting structure is employed for a mid-mount mower, the second branch output is disposed in a lower portion of the power branching device to transmit power from the power branching device to the mower unit. The first branch output is disposed in an upper portion or lower portion of the power branching device, depending on the position of an input shaft of the transmission. In this case, the power branching device may include a vertical intermediate shaft operatively connected to the branch input shaft, with the first branch output and second branch output provided on the intermediate shaft. Then, despite the simple construction of the power branching device, the first and second branch outputs may be set to freely selected heights. Where the branch input shaft extends horizontally, power is transmitted from the branch input shaft to the intermediate shaft through a bevel gear mechanism.

In a preferred embodiment of this invention, the propelling drive transmitting device comprises a belt transmission mechanism. This suppresses solid-borne vibration between the power branching device and the transmission, which contributes to suppression of vibration and noise of the entire power transmitting structure. Where a belt transmission mechanism is used also between the power branching device and mower unit, solid-borne vibration therebetween is suppressed. Where a belt transmission mechanism is used also as the engine power transmitting device extending between the engine output shaft and the branch input shaft, solid-borne vibration among all of the engine, power branching device, transmission and mower unit is suppressed, which may further suppress vibration and noise of the entire power transmitting structure. Where vibration and noise are not an important consideration, a simple transmission shaft may be employed as the power transmitting device to provide an advantage of low cost.

In a further embodiment of this invention, the power branching device further includes a third branch output. The third branch output may be provided on a shaft common to the first branch output or second branch output. Then, the power branching device may have a simplified construction despite the presence of a third branch line.

The power transmitting structure having the power branching device and transmission disposed independently of each other according to this invention is advantageous especially where the transmission is a stepless transmission, particularly an HST, which has a high degree of freedom for layout.

Other features and advantages of this invention will be apparent from the following description.

DESCRIPTION OF THE PREFERRED EMBODIMENTS

Embodiments of this invention will be described with reference to the drawings.

Figure 1:
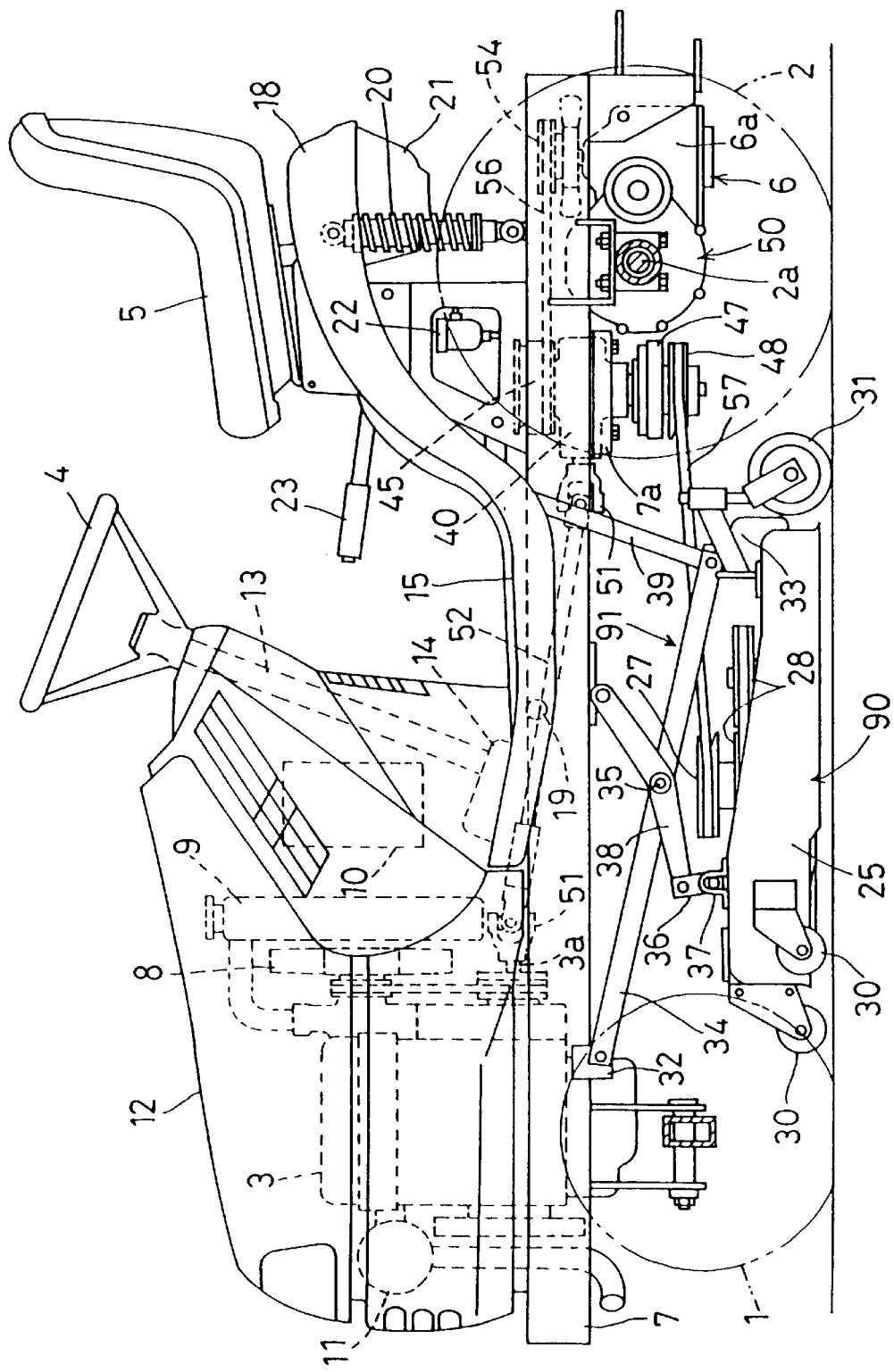
FIG. 1 is a side elevation of a mid-mount mower employing a power transmitting structure according to this invention.
Figure 2:
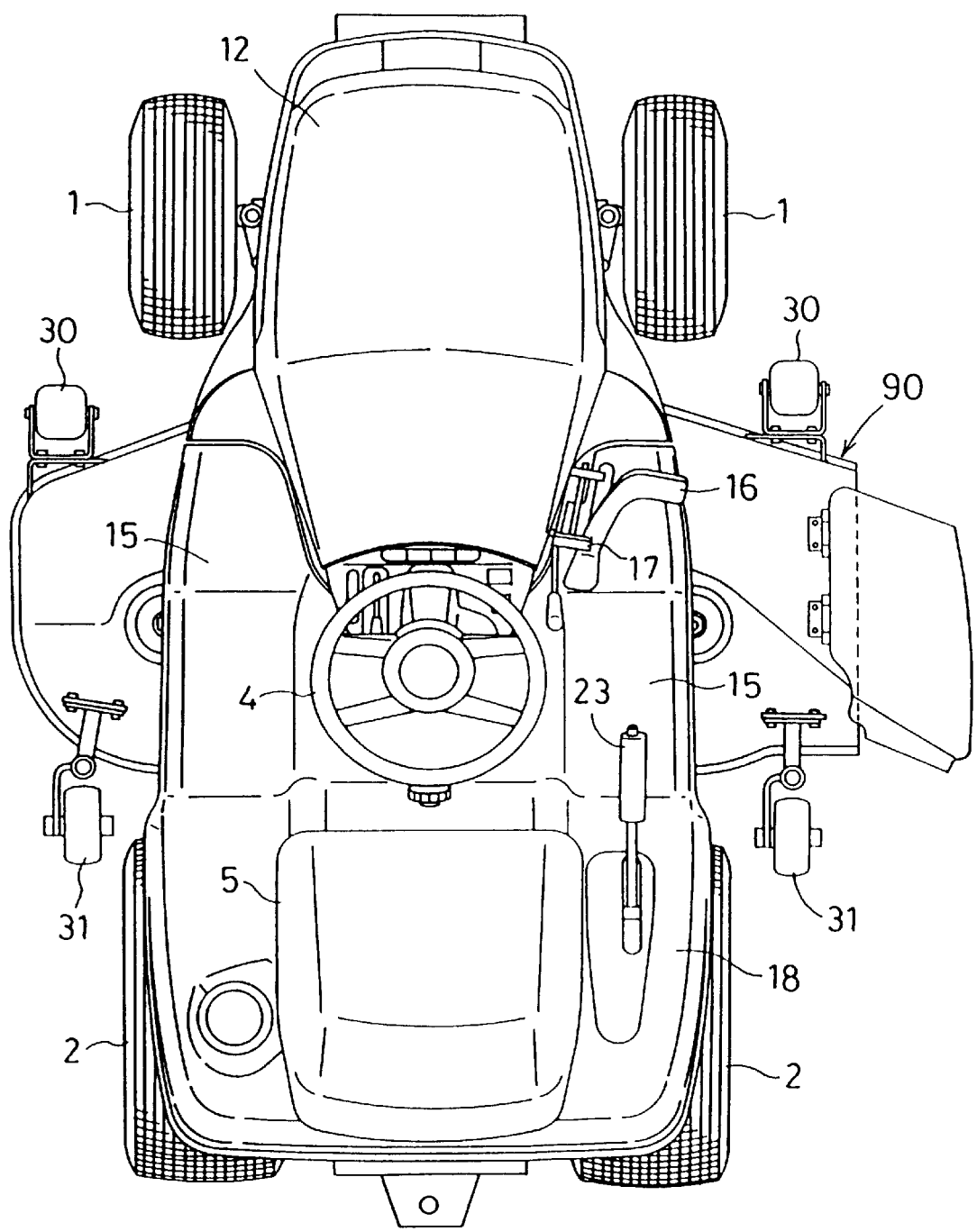
FIG. 2 is a plan view of the mid-mount mower shown in FIG. 1.

As shown in FIGS. 1 and 2, a mid-mount mower has dirigible front wheels 1 and drivable rear wheels 2 supporting a vehicle body with an engine 3 mounted on a front portion thereof. The vehicle body includes a steering wheel 4 disposed centrally thereof, and a driver's seat 5 mounted on a rear portion. A hydrostatic stepless transmission (HST) 6 is disposed in a lower rear position of the vehicle body for transmitting power to the rear wheels 2. A mower unit 90 is vertically movably suspended from the vehicle body between the front wheels 1 and rear wheels 2.

The engine 3 is a diesel engine supported through elastic elements such as rubber (not shown) by a pair of right and left body frames 7 forming the vehicle body. A radiator fan 8, a radiator 9 and a battery 10 are arranged rearwardly of the engine 3, while a muffler 11 is disposed forwardly of the engine 3. These components are enclosed in an openable engine hood 12. The steering wheel 4 is connected to a steering stem 13 having a steering gear mechanism 14 at a lower end thereof. The steering gear mechanism 14 is interlocked to the front wheels 1 (an interlocking structure not to be described herein). In a righthand front position of a footrest 15 are a shift pedal 16 for shifting the transmission 6, and a brake pedal 17.

The footrest 15 is formed integral with rear fenders 18. This integral structure is connected at a forward end thereof to the body frames 7 to be oscillatable about a transverse axis 19, and elastically supported at a rearward end by the body frames 7 through a pair of right and left suspension springs 20. The driver's seat 5 is mounted between the right and left rear fenders 18. Thus, the component supporting the driver's seat 5 is elastically supported by the body frames 7 through the suspension springs 20 to provide for a comfortable ride.

A plastic fuel tank 21 and reserve tank 22 are arranged below the driver's seat 5. A lift lever 23 is disposed at the right side of the driver's seat 5 for raising and lowering the mower unit 90.

Figure 3:
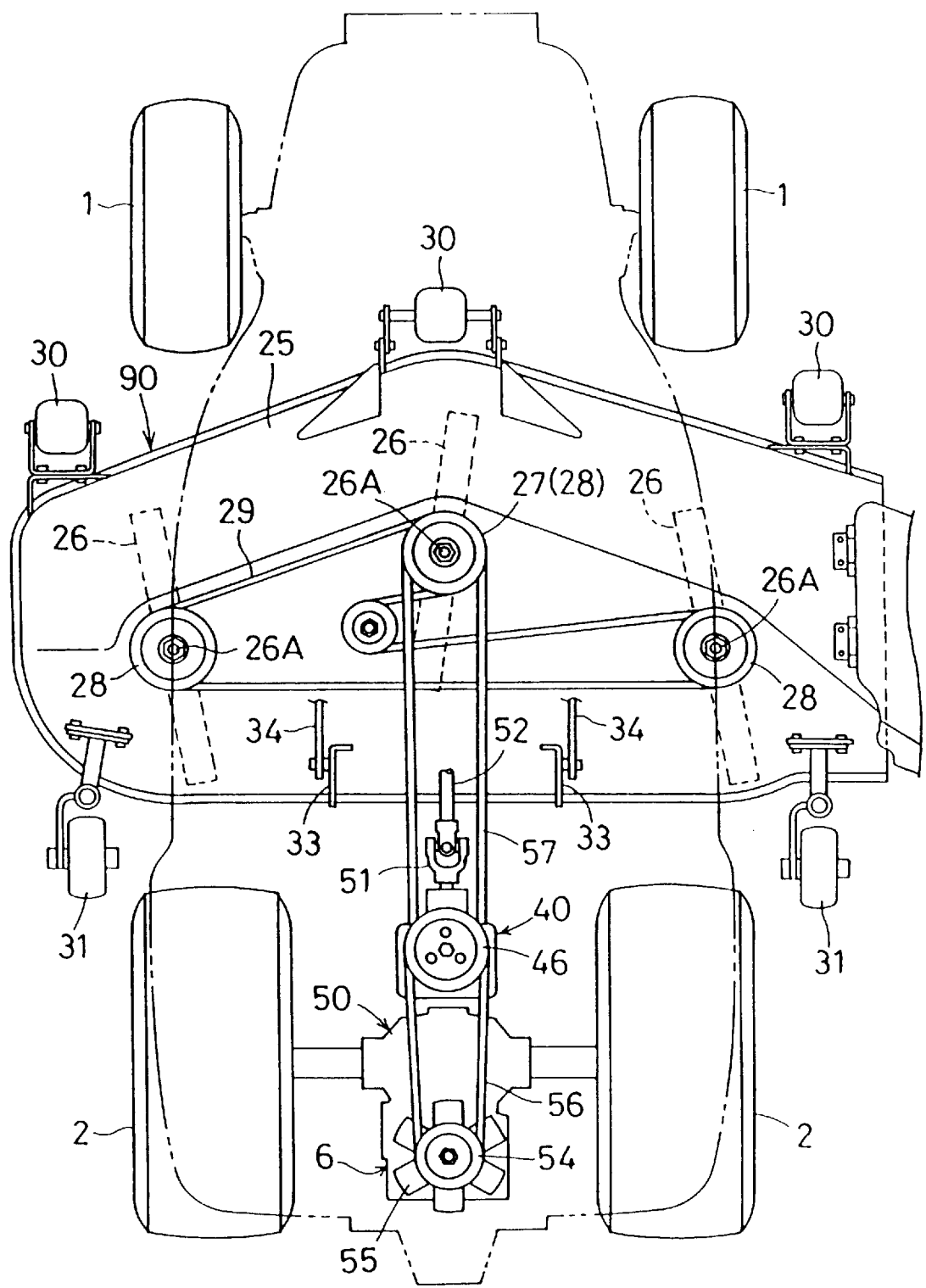
FIG. 3 is a plan of the mid-mount mower showing the power transmitting structure.

As shown in FIG. 3, the mower unit 90 includes a blade housing 25, and three blades 26 rotatable about vertical axes relative to the blade housing 25. The middle blade 26 has a rotary shaft 26A with an input pulley 27 and a drive pulley 28 attached to upper positions thereof. An endless belt 29 is wound around the drive pulley 28 and drive pulleys 28 mounted on rotary shafts 26A of the other two blades 26. Thus, the three blades 26 are driven simultaneously by the power transmitted to the input pulley 27.

The mower unit 90 further includes rollers 30 attached to front positions of the blade housing 25, and gauge wheels 31 attached to rear positions thereof. The mower unit 90 is vertically movably supported by the body frames 7 through a link mechanism 91. As shown in FIG. 1, the link mechanism 91 includes a pair of right and left main links 34 each extending between a support plate 32 secured to one of the body frames 7 and a bracket 33 secured to a rear position of the blade housing 25, and seesaw links 38 each supported at one end thereof by one of the body frames 7 and at the other end supported by an upper surface of the blade housing 25 through a link piece 36 and a bracket 37. Each seesaw link 38 is pivotally connected in an intermediate position thereof to an intermediate position of one of the main links 34 through a cross axis 35. The brackets 33 in the rear positions of the blade housing 25 are connected to a suspension link 39 mechanically interlocked to the lift lever 23. Thus, the mower unit 90 is vertically movable by manually operating the lift lever 23.

As shown in FIG. 1, a housing 6a of HST 6 is disposed rearwardly of and formed integral with an axle case 50 containing a differential (not shown) for driving the rear wheels 2. The HST 6 outputs power in varied speeds through the differential to rear axle shafts 2a in the axle case 50. A power branching device 40 is disposed in a position intermediate between the axle case 50 and mower unit 90 and below a region of transition between the foot rest 15 and rear fenders 18, for dividing the power from the engine 3 for transmission to HST 6 and mower unit 90.

Figure 4:
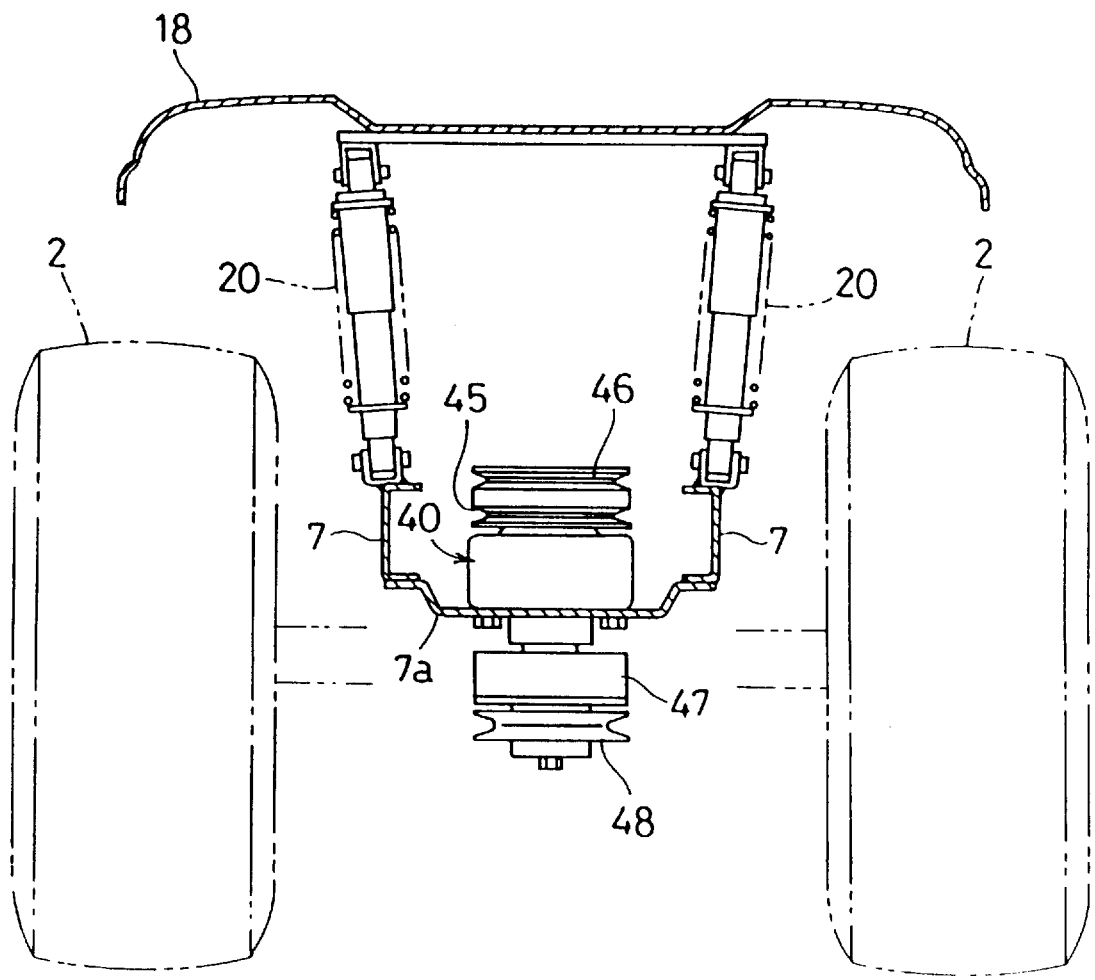
FIG. 4 is a rear view in vertical section of the mid-mount mower.
Figure 5:
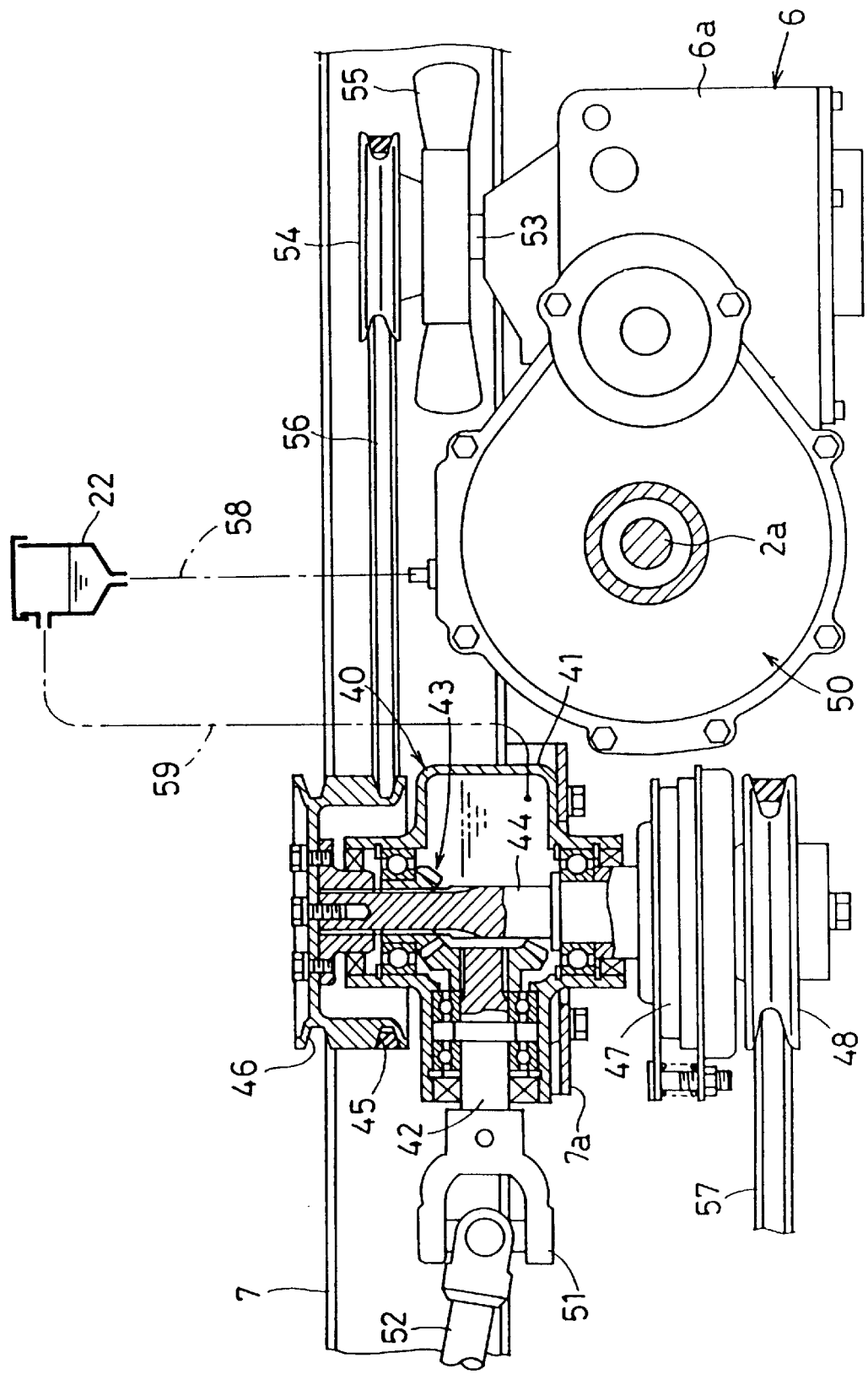
FIG. 5 is a side view, partly in section, of a region around the power transmitting structure.

Referring to FIGS. 3 through 5, the power branching device 40 has a housing 41 supported by the body frames 7 through a horizontal support plate 7a extending between and fixed to the right and left body frames 7. The power branching device 40 includes a branch input shaft 42 projecting forwardly from an upper position thereof, and a vertical intermediate shaft 44 mounted in the housing 41 for receiving power from the branch input shaft 42 through a bevel gear mechanism 43. The intermediate shaft 44 has, secured to an upper end thereof, a propelling pulley 45 acting as a first branch output for transmitting power to HST 6, and a PTO pulley 46 formed integral with the propelling pulley 45 to act as a third branch output. The power branching device 40 further includes a mower driving pulley 48 secured to a lower end of the intermediate shaft 44 to act as a second branch output for transmitting power to the mower unit 90 through an electromagnetic clutch 47. The electromagnetic clutch 47 is electrically engageable to transmit power from the power branching device 40 to the mower unit 90, and disengageable to break the power transmission to the mower unit 90 to stop the latter.

The engine 3 has an engine output shaft 3a projecting rearwardly (see FIG. 1). A transmission shaft 52 having universal joints 51 at opposite ends thereof extends between the output shaft 3a and the branch input shaft 42 of the power branching device 40 to act as an engine power transmitting device. The HST 6 includes a vertical input shaft 53 carrying an input pulley 54 and a cooling fan 55. An endless belt 56 is wound around the input pulley 54 and the propelling pulley 45 to form a propelling drive transmitting device. Further, and endless belt 57 is wound around the input pulley 27 of the mower unit 90 and the mower driving pulley 48.

As shown in FIG. 5, the reserve tank 22 is provided for storing lubricating oil for the axle case 50. The reserve tank 22 is disposed above the axle case 50, with an oil replenishing pipeline 58 extending therebetween. A pipeline 59 extends between a position above a liquid level in the reserve tank 22 and oil stored in the power branching device 40. This construction enables confirmation of a liquid level in the axle case 50 by referring to the interior of the reserve tank 22, and enables the reserve tank 22 to act as a breather for the power branching device 40.

With the above power transmitting structure, power is transmitted from the engine through the transmission shaft 52 to the branch input shaft 42 in the upper position of the power branching device 40 during a grass cutting operation. The transmission shaft 52 is disposed high above the ground to secure a large space above the mower unit 90 for accommodating vertical movement of the mower unit 90. Further, a transmission line is formed for transmitting power to the mower unit 90 from the mower driving pulley 48 disposed in a lower position of the power branching device 40. Thus, power is transmitted to the mower unit 90 from a position close thereto and at an appropriate height above the ground. The power branching device 40 is supported by the body frames 7, and a belt is used to form the line for transmitting power from the power branching device 40 to HST 6. This construction suppresses vibration of the engine 3 directly transmitted to HST 6. Where an external implement such as a grass catcher or an earth-moving implement is attached to the vehicle, the external implement is driven through a belt wound around an input pulley (not shown) of the external implement and the PTO pulley 46 of the power branching device 40. In this case, a belt winding operation may be carried out with ease and without interfering with the other transmission lines since the PTO pulley 46 is formed above the propelling pulley 45 of the power branching device 40.

Figure 6:
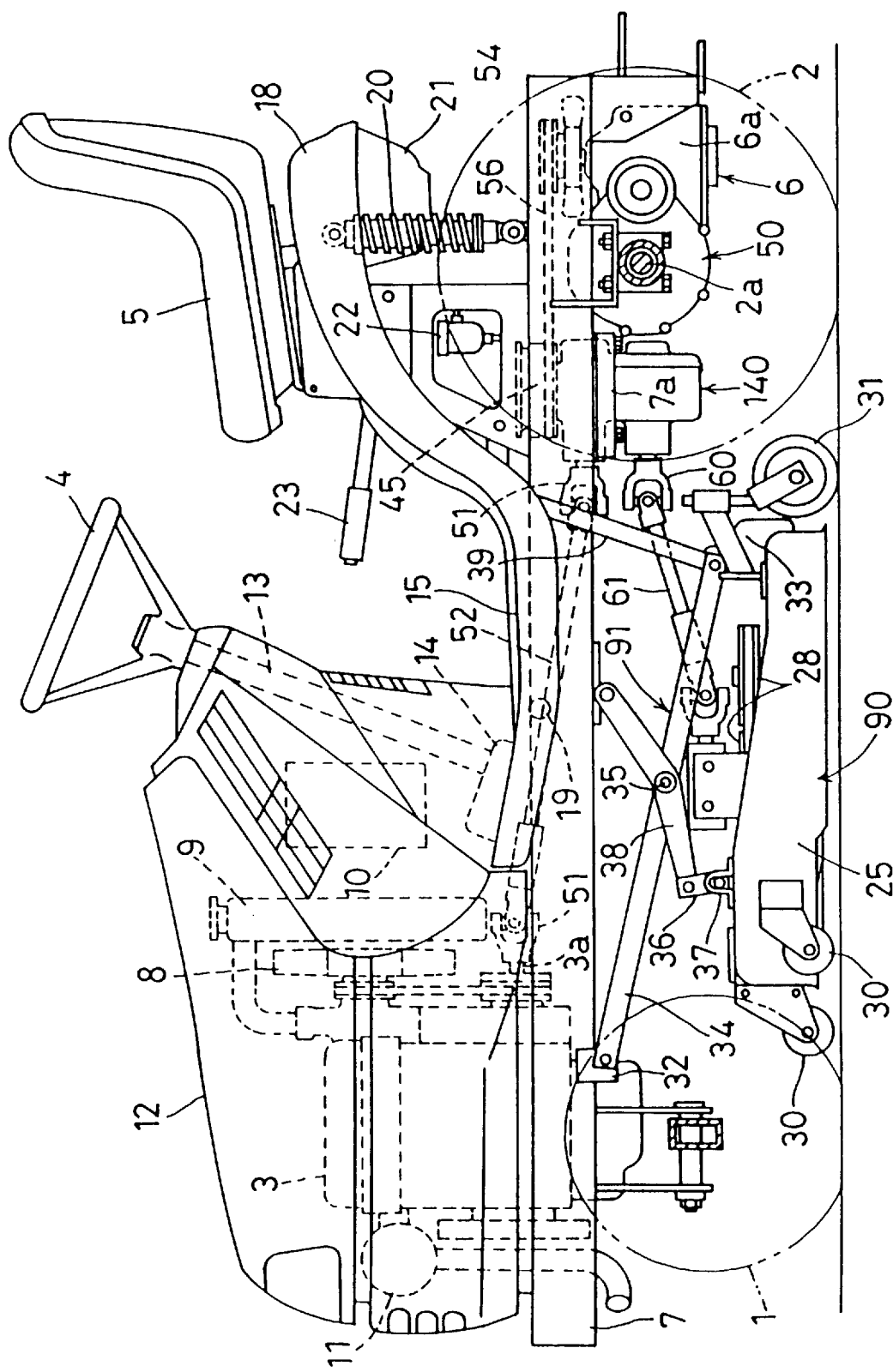
FIG. 6 is a side elevation of a mid-mount mower in another embodiment this invention.

FIG. 6 shows a mid-mount mower employing a power transmitting structure different from the foregoing embodiment. This power transmitting structure transmits power from the power branching device 40 to the mower unit 90 through a transmission shaft. The other aspects of the construction are the same as in the foregoing embodiment. Like reference numerals are used to identify like parts which are the same as in the foregoing embodiment and will not be described again.

Figure 7:
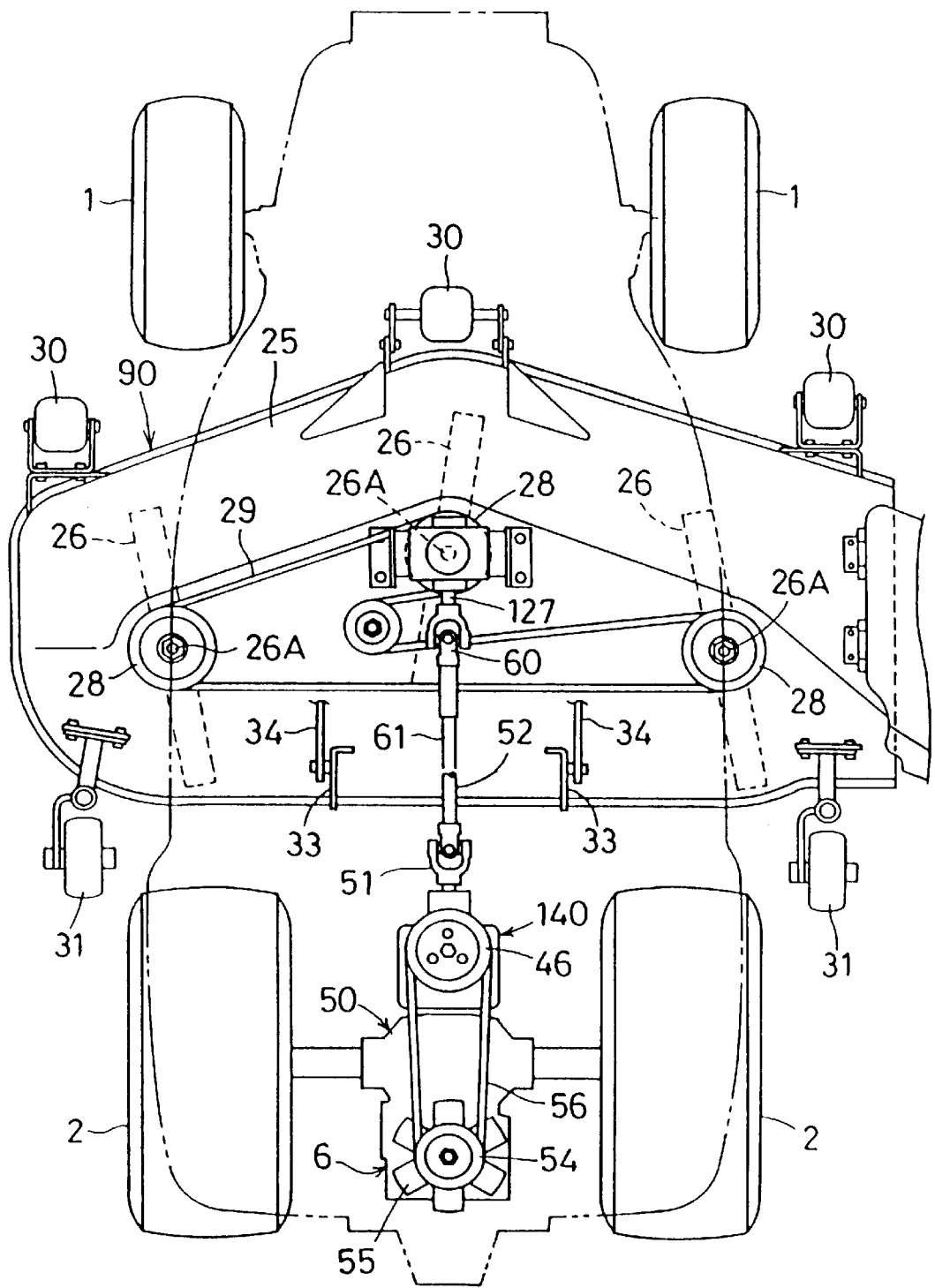
FIG. 7 is a plan view showing a power transmitting structure of the mid-mount mower shown in FIG. 6.

As shown in FIG. 7, the mower unit 90 includes three blades 26 rotatable about vertical axes relative to the blade housing 25. The middle blade 26 has a rotary shaft 26A interlocked in an upper position thereof to a rearwardly projecting input shaft 127 through gearing (not shown). The rotary shaft 26A has a drive pulley 28 attached to an upper position thereof. An endless belt 29 is wound around the drive pulley 28 and drive pulleys 28 mounted on rotary shafts 26A of the other two blades 26. Thus, the three blades 26 are driven simultaneously by the power transmitted to the input shaft 127.

Figure 8:
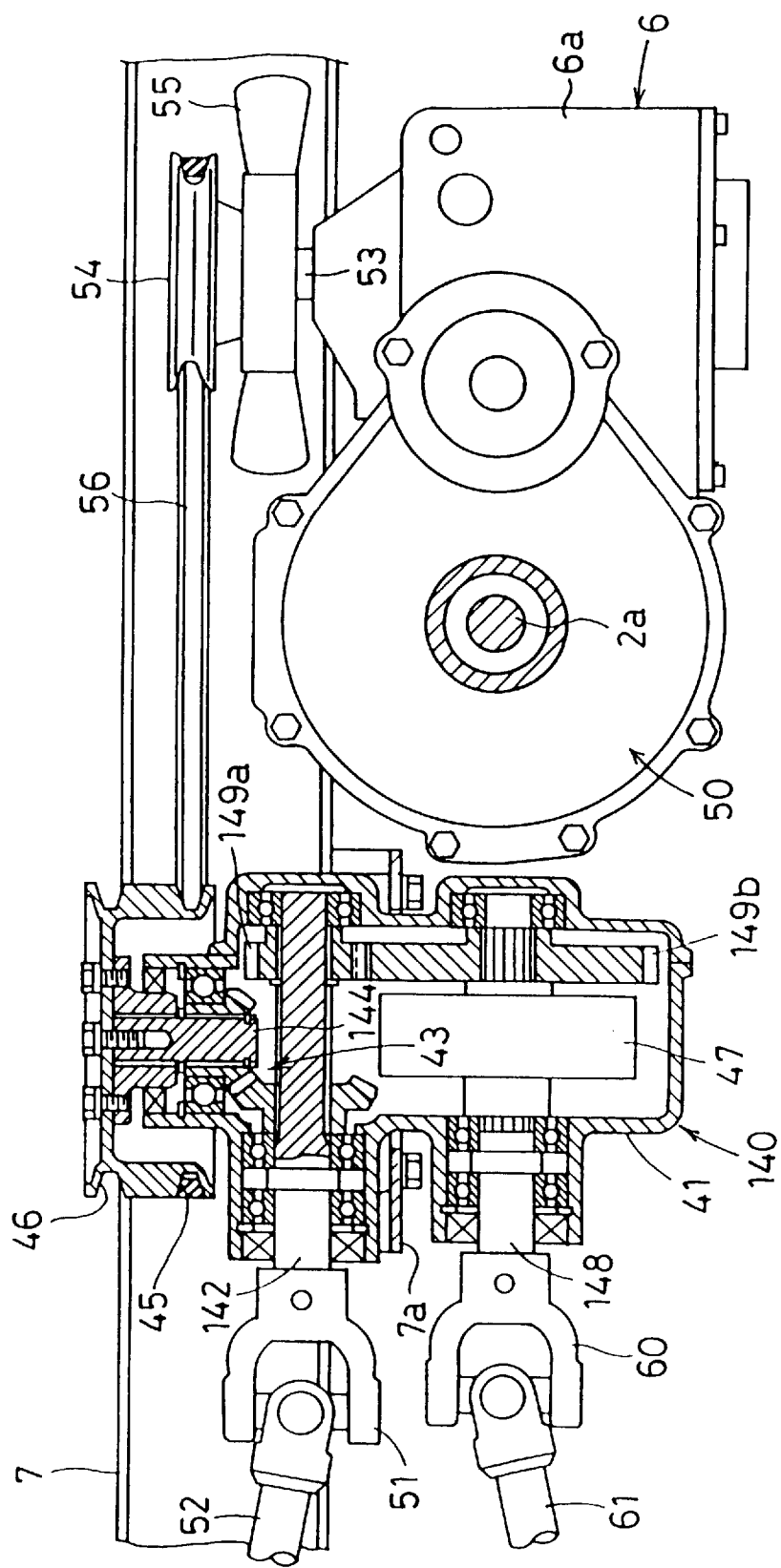
FIG. 8 is a side view, partly in section, of a region around the power transmitting structure of the mid-mount mower shown in FIG. 6.

Referring to FIG. 8, a power branching device 140 is supported by the body frames 7 through a horizontal support plate 7a extending between and fixed to the right and left body frames 7. The power branching device 140 includes a branch input shaft 142 projecting forwardly from an upper region thereof, and a vertical intermediate shaft 144 mounted in an upper end region for receiving power from the branch input shaft 142 through a bevel gear mechanism 43. The intermediate shaft 144 has, secured to an upper end thereof, a propelling pulley 45 for transmitting power to HST 6, and a PITO pulley 46 formed integral with the propelling pulley 45 for transmitting power to an external implement or the like. The power branching device 40 further includes a small diameter gear 149a mounted on the branch input shaft 142, and a large diameter gear 149b meshed with the small diameter gear 149a from below. The power branching device 140 also includes a mower driving output shaft 148 projecting forwardly to act as a second branch output for transmitting power from the large diameter gear 149b to the mower unit 90 through an electromagnetic clutch 47. The electromagnetic clutch 47 is mounted in the power branching device 140 to be electrically engageable to transmit power from the power branching device 40 to the mower unit 90, and disengageable to break the power transmission to the mower unit 90 to stop the latter. A drive shaft 61 extends between and connected through universal joints 60 to the input shaft 127 of the mower unit 90 and the mower driving output shaft 148.

Figure 9:
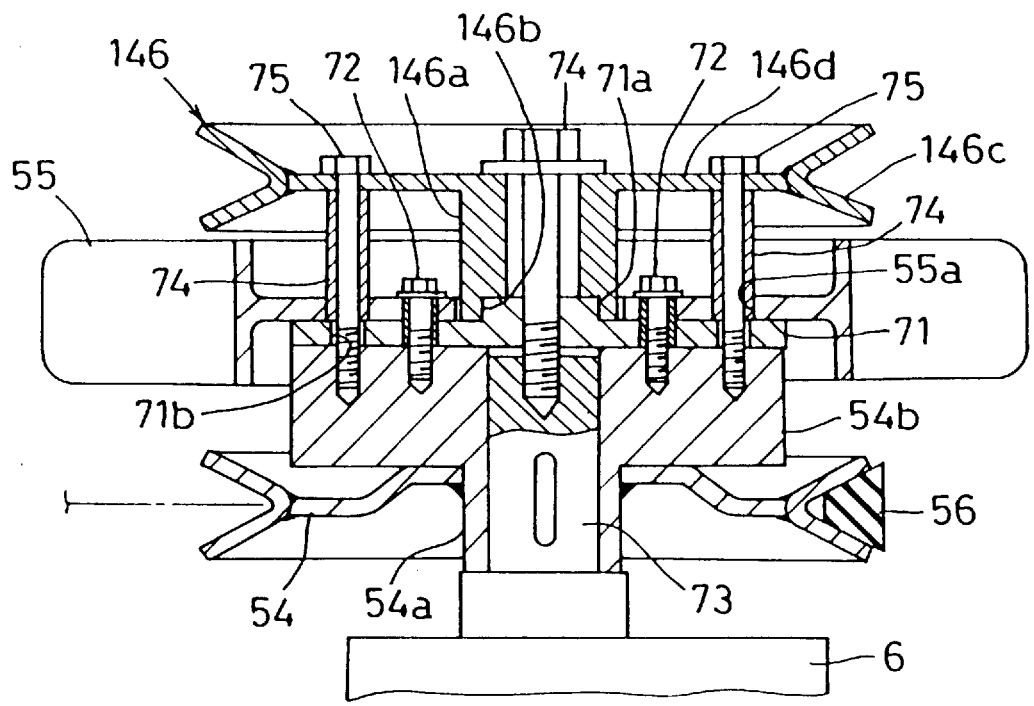
FIG. 9 is a side view in vertical section showing attachment of an auxiliary power takeoff pulley.
Figure 10:
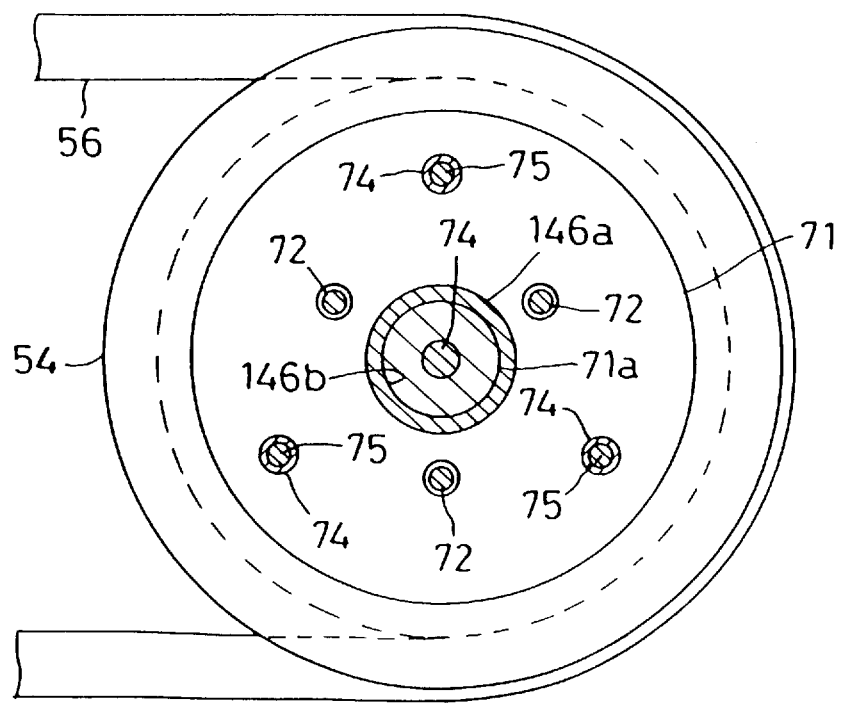
FIG. 10 is a plan view in cross section showing attachment of the auxiliary power takeoff pulley.
Figure 11:
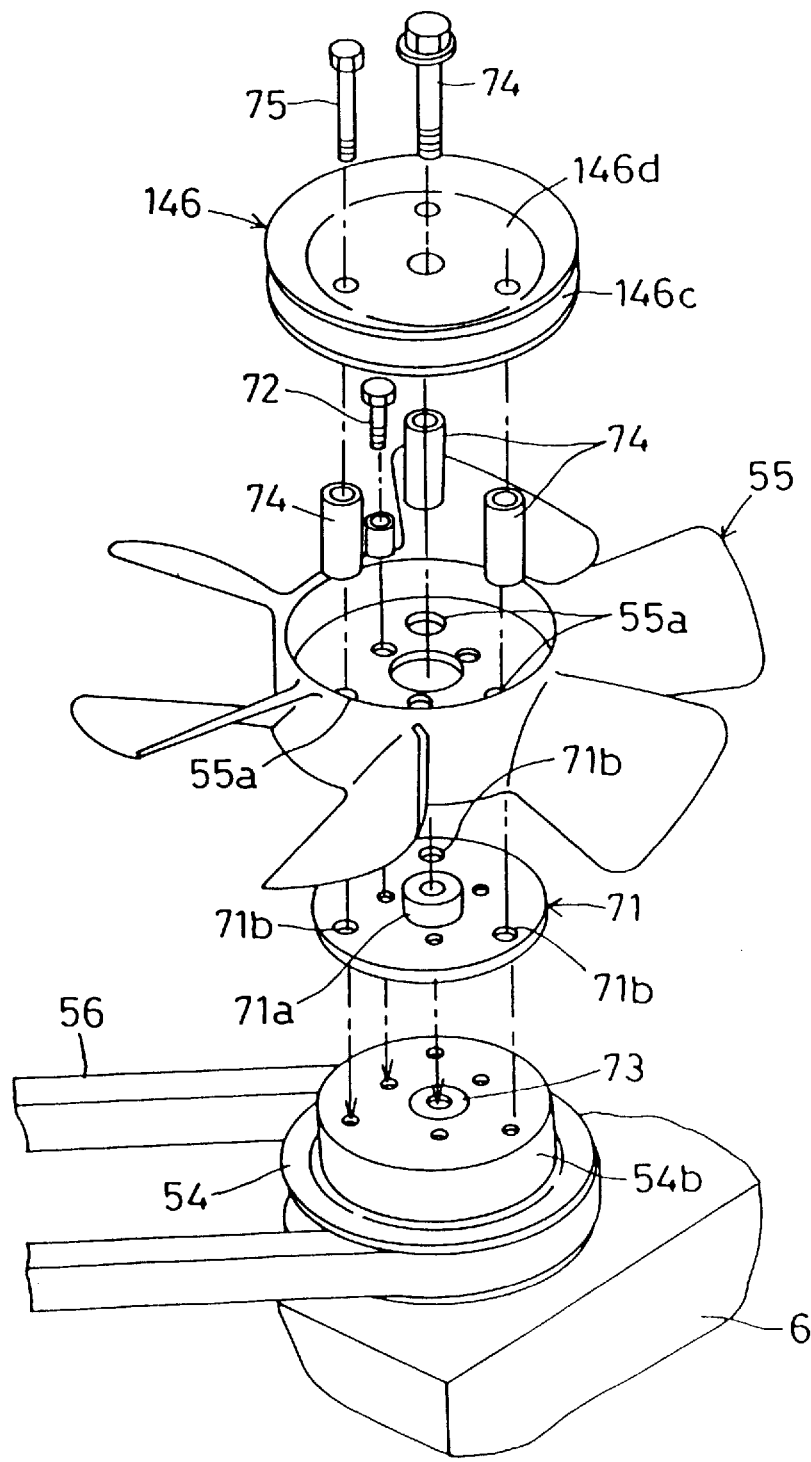
FIG. 11 is an exploded perspective view of the auxiliary power takeoff pulley.

FIGS. 9 through 11 show a PTO pulley included in HST 6 instead of the power branching device 40.

As shown in FIG. 9, HST 6 includes a cooling fan 55 disposed above an input pulley 54. In this mid-mount mower, where a working implement relating to grass cutting is attached to the rear end of the vehicle body, a PTO pulley 46 may be removably mounted above the input pulley 54 of HST 6 for transmitting power to the working implement.

A structure for attaching the PTO pulley 146 will be described next. The input pulley 54 of HST 6 includes a boss 54a having, formed integral therewith, a mounting seat 54b for the cooling fan 55. The cooling fan 55 is attached to the mounting seat 54b of the input pulley 54 through a metallic coupling plate 71. The cooling fan 55 and coupling plate 71 are fastened to the mounting seat 54b of the input pulley 54 by three bolts 72 arranged at angular intervals of 120 degrees. The PTO pulley 146 includes an elongated boss 146a with a lower end surface thereof defining a centering recess 146b for fitting on a projection 71a of the metallic coupling plate 71. The PTO pulley 146 is fixed against axial detachment by a bolt 74 screwed into an input shaft 73 of HST 6. Further, the PTO pulley 146 has a disk portion 146d formed between the boss 146a and a groove 146c thereof and fixed to the mounting seat 54b of the input pulley 54 against rotation about its axis by three bolts 75 arranged at angular intervals of 120 degrees and spacers 74 fitted on the bolts 75. The cooling fan 55 defines bores 55a for receiving the spaces 74. The metallic coupling plate 71 defines bores 71b for receiving the bolts 75. Thus, the plastic fan 55 is not bent or cracked when the bolts 75 are tightened with the spacers 74 placed in contact with the metallic coupling plate 71. By employing the coupling plate 71 in attaching the input pulley 54 to the end of the input shaft 73 of HST 6, the input pulley 54 may easily be positioned relative to and fixed to the end of the input shaft 73. This construction does not require an input pulley positioning shoulder to be formed at the end of the input shaft 73 of HST 6 or a snap ring to be attached to the input shaft 73, in which case the input pulley 54 would have to be pressed against the shoulder or snap ring and fastened with bolts and nuts.

Besides the foregoing embodiments, the power transmitting structure according to this invention may be modified in varied ways as follows. In the following description, like reference numerals are used to identify like parts which are the same as in the foregoing embodiments.

Figure 12:
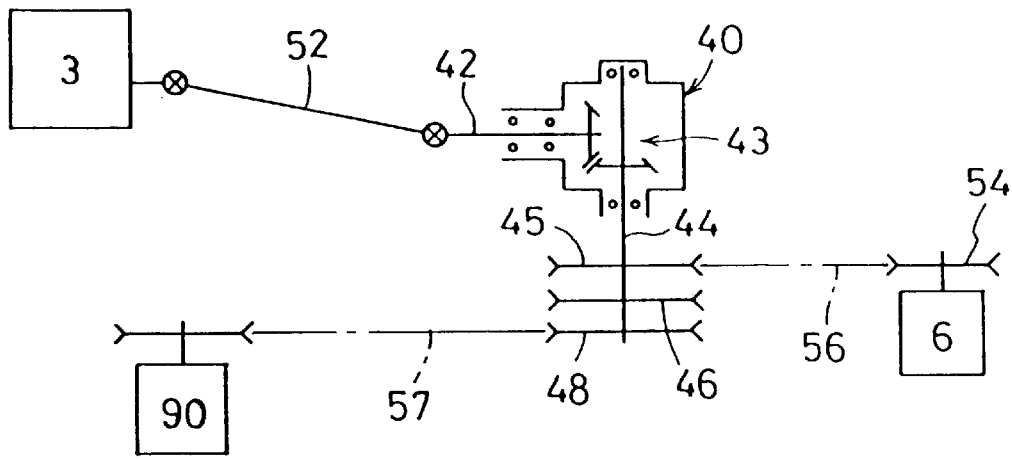
FIG. 12 is a schematic view of a modified power transmitting structure according to this invention.

(1) As shown in FIG. 12, a transmission line is formed for transmitting power from the branch input shaft 42 extending longitudinally of the vehicle body to the vertical intermediate shaft 44 through the bevel gear mechanism 43. The intermediate shaft 44 has, attached to one end portion (a lower end portion in the illustrated example) thereof, a propelling pulley 45 for transmitting power to HST 6, a mower driving pulley 48 for transmitting power to the mower unit 90, and a PTO pulley 46 for transmitting power to an external working implement. In this construction, a clutch or the like may be disposed downstream of the mower driving pulley 48 to be switchable between a position for transmitting power to the mower unit 90 and a position for breaking the power transmission.

Figure 13:
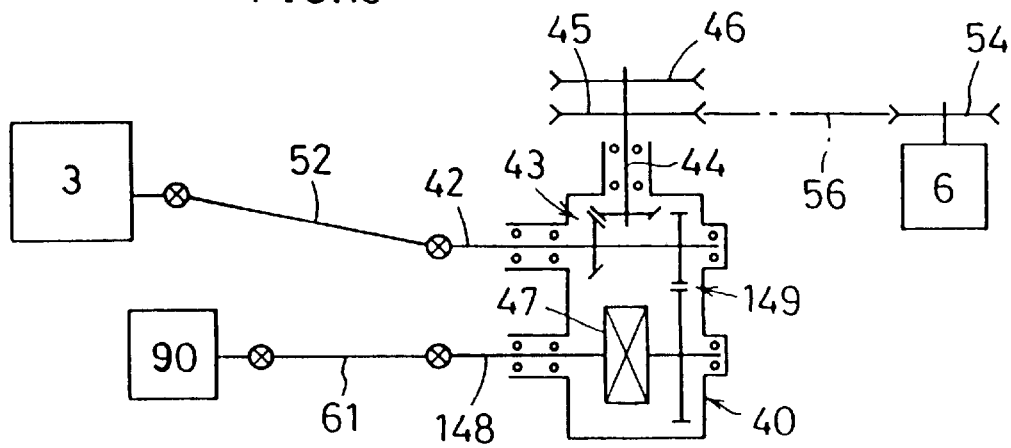
FIG. 13 is a schematic view of another modified power transmitting structure according to this invention.

(2) As shown in FIG. 13, a transmission line is formed for transmitting power from the branch input shaft 42 extending longitudinally of the vehicle body to the vertical intermediate shaft 44 through the bevel gear mechanism 43. The intermediate shaft 44 has, attached to an upper end thereof, a propelling pulley 45 for transmitting power to HST 6, and a PTO pulley 46 for transmitting power to an external working implement. A mower driving shaft 148 extends longitudinally of the vehicle body to transmit power from the branch input shaft 42 to the mower unit 90 through a gearing 149 and a clutch 47. In this construction, the clutch 47 is not limited to an electromagnetic clutch, but may be a mechanically operable clutch such as a wet-type multidisk clutch or a dog clutch.

Figure 14:
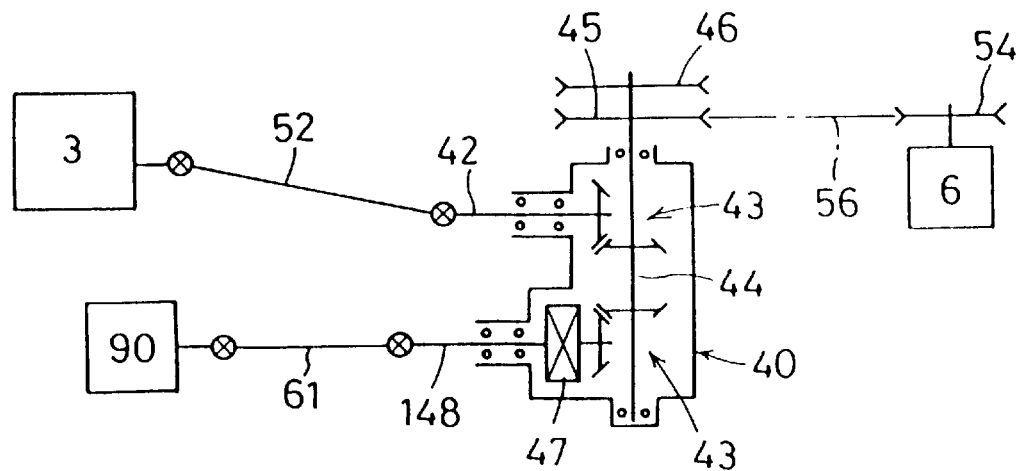
FIG. 14 is a schematic view of a further modified power transmitting structure according to this invention.

(3) As shown in FIG. 14, a transmission line is formed for transmitting power from the branch input shaft 42 extending longitudinally of the vehicle body to the vertical intermediate shaft 44 through the bevel gear mechanism 43. The intermediate shaft 44 has, attached to an upper end thereof, a propelling pulley 45 for transmitting power to HST 6, and a PTO pulley 46 for transmitting power to an external working implement. A mower driving shaft 148 extends longitudinally of the vehicle body from a lower end of the intermediate shaft 44 to transmit power to the mower unit 90 through a bevel gear mechanism 43 and a clutch 47. In this construction, the clutch 47 is not limited to an electromagnetic clutch, but may be a mechanically operable clutch such as a wet-type multidisk clutch or a dog clutch.

Figure 15:
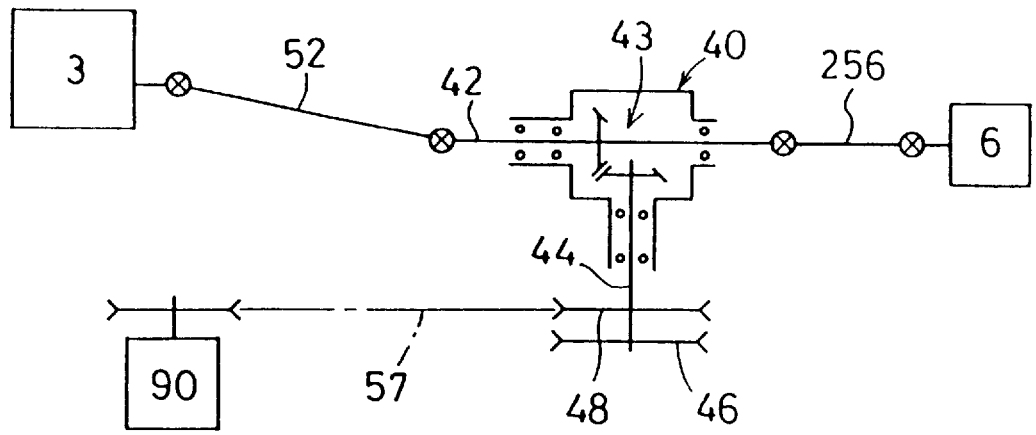
FIG. 15 is a schematic view of a still further modified power transmitting structure according to this invention.

(4) As shown in FIG. 15, a transmission line is formed for transmitting power from the branch input shaft 42 extending longitudinally of the vehicle body to the vertical intermediate shaft 44 through the bevel gear mechanism 43. The intermediate shaft 44 has, attached to a lower end thereof, a mower driving pulley 48 for transmitting power to the mower unit 90, and a PTO pulley 46 for transmitting power to an external working implement. The branch input shaft 42 extends to a position rearwardly of the power branching device 40 to be connected to a propelling transmission shaft 256 for transmitting power to HST 6. In this construction, a clutch or the like may be disposed downstream of the mower driving pulley 48 to be switchable between a position for transmitting power to the mower unit 90 and a position for breaking the power transmission.

Figure 16:
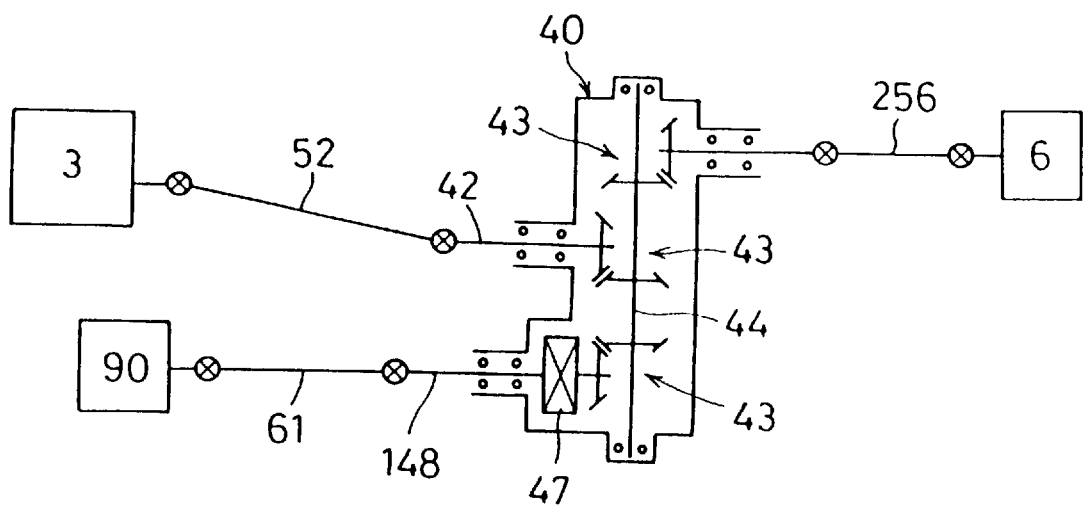
FIG. 16 is a schematic view of a still further modified power transmitting structure according to this invention.

(5) As shown in FIG. 16, a transmission line is formed for transmitting power from the branch input shaft 42 extending longitudinally of the vehicle body to the vertical intermediate shaft 44 through the bevel gear mechanism 43. The intermediate shaft 44 is connected at an upper end thereof through a bevel gear mechanism 43 to a propelling transmission shaft 256 for transmitting power to HST 6. Further, the intermediate shaft 44 is connected at a lower end thereof to a mower driving shaft 148 for transmitting power to the mower unit 90 through a bevel gear mechanism 43 and a clutch 47. This construction does not include a transmission line for transmitting power to an external working implement, and the clutch 47 is not limited to an electromagnetic clutch, but may be a mechanically operable clutch such as a wet-type multidisk clutch or a dog clutch.

Figure 17:
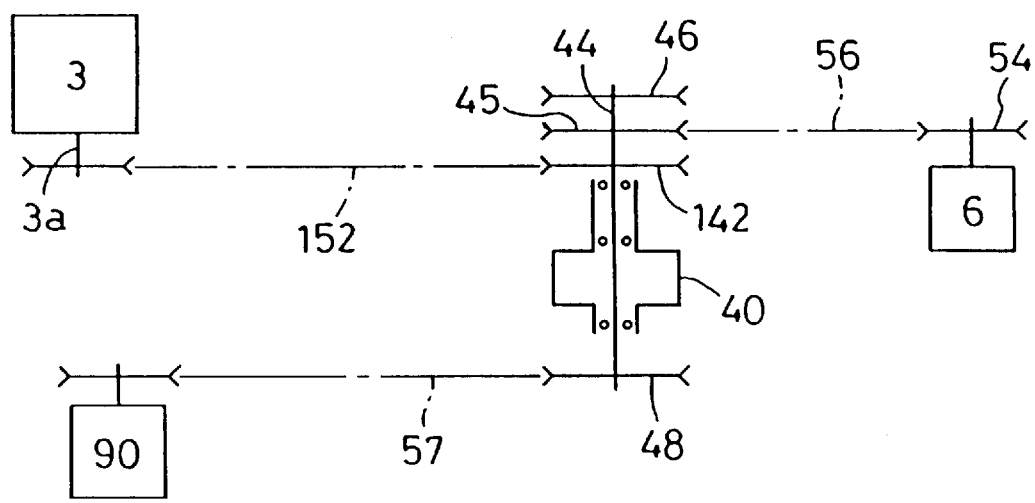
FIG. 17 is a schematic view of a still further modified power transmitting structure according to this invention.

(6) As shown in FIG. 17, a branch input pulley 142 is mounted directly on the intermediate shaft 44 for forming a belt transmission mechanism 152 interconnecting the engine output shaft 3*a* and the power branching device 40. The intermediate shaft 44 has, attached to an upper end thereof, a propelling pulley 45 for transmitting power to HST 6, and a PTO pulley 46 for transmitting power to an external working implement. Further, the intermediate shaft 44 has, attached to a lower end thereof, a mower driving pulley 48 for transmitting power from the intermediate shaft 44 to the mower unit 90. In this construction, a clutch or the like may be disposed downstream of the mower driving pulley 48 to be switchable between a position for transmitting power to the mower unit 90 and a position for breaking the power transmission.

All of the transmission structures embodying this invention described hereinbefore employ a hydrostatic stepless transmission. However, it is of course possible to employ a different type of stepless transmission or a gear type stepped transmission within the scope of this invention.

What is claimed is:

1. A power transmitting structure for a self-propelling vehicle having a working implement, comprising:

an engine mounted adjacent front wheels disposed at a forward portion of the vehicle;

an axle shaft for rotating drive wheels disposed at a rear portion of the vehicle;

a transmission operatively connected to and disposed rearwardly of said axle shaft; and power branching means disposed forwardly of said axle shaft and including a branch input shaft operatively connected to said engine, a first branch output shaft operatively connected to said transmission, and a second branch output shaft operatively connected to said working implement;

wherein said power branching means is disposed independently of said transmission, and wherein said engine and said branch input shaft are operatively connected to each other through engine power transmitting means extending longitudinally of the vehicle.

2. A power transmitting structure as defined in claim 1, wherein said transmission has a housing formed separately from a housing of said power branching means.

3. A power transmitting structure as defined in claim 1, wherein said working implement comprises a vertically adjustable mower unit disposed in a space below said engine power transmitting means.

4. A power transmitting structure as defined in claim 3, wherein said first branch output is disposed in an upper portion of said power branching means, and said second branch output is disposed in a lower portion of said power branching means.

5. A power transmitting structure as defined in claim 4, wherein said power branching means includes a vertical intermediate shaft operatively connected to said branch input shaft, said first branch output being disposed in an upper region of said intermediate shaft, and said second branch output being disposed in a lower region of said intermediate shaft.

6. A power transmitting structure as defined in claim 3, wherein said first branch output and said second branch output are disposed in a lower region of said intermediate shaft.

7. A power transmitting structure as defined in claim 6, wherein said power branching means includes a vertical intermediate shaft operatively connected to said branch input shaft, said first branch output and said second branch output being disposed in a lower region of said intermediate shaft.

8. A power transmitting structure as defined in claim 1, wherein said engine has an engine output shaft extending horizontally, and said engine power transmitting means comprises a transmission shaft.

9. A power transmitting structure as defined in claim 1, wherein said engine has an engine output shaft extending vertically, and said engine power transmitting means comprises a belt transmission mechanism.

10. A power transmitting structure as defined in claim 9, wherein said propelling drive transmitting means comprises a belt transmission mechanism.

11. A power transmitting structure as defined in claim 10, wherein said second branch output and said mower unit are connected to each other through a belt transmission mechanism.

12. A power transmitting structure as defined in claim 10, wherein said second branch output and said mower unit are connected to each other through a transmission shaft having universal joints attached to opposite ends thereof.

13. A power transmitting structure as defined in claim 9, wherein said engine power transmitting means comprises a transmission shaft.

14. A power transmitting structure as defined in claim 1, wherein said power branching means further includes a third branch output.

15. A power transmitting structure as defined in claim 14, wherein said third branch output and said first branch output comprise a third output pulley and a first output pulley mounted on a common shaft, respectively.

16. A power transmitting structure as defined in claim 14, wherein said third branch output and said second branch output comprise a third output pulley and a second output pulley mounted on a common shaft, respectively.

17. A power transmitting structure as defined in claim 1, wherein said transmission comprises a stepless transmission.

* * * * *